United States Patent [19]

Kapp et al.

[11] Patent Number: 5,492,799
[45] Date of Patent: Feb. 20, 1996

[54] AZOPYRAZOLONE MASKING COUPLERS

[75] Inventors: Daniel L. Kapp, Rochester, N.Y.; Robert J. Ross, Elmhurst, Ill.; Stephen P. Singer, Spencerport, N.Y.; Bernard A. Clark, Berkshire, England

[73] Assignee: Eastman Kodak Company, Rochester, N.Y.

[21] Appl. No.: 263,642

[22] Filed: Jun. 22, 1994

Related U.S. Application Data

[63] Continuation-in-part of Ser. No. 996,228, Dec. 23, 1992, abandoned.

[51] Int. Cl.$^6$ ........................................ G03C 7/18
[52] U.S. Cl. .................. 430/558; 430/562; 430/434; 430/359
[58] Field of Search .................... 430/551, 558, 430/562, 359, 434

[56] References Cited

U.S. PATENT DOCUMENTS 4,227,559  7/1981  Jaeken ..................................... 430/549

FOREIGN PATENT DOCUMENTS

| 213490 | 3/1987 | European Pat. Off. . |
|---|---|---|
| 2643965 | 7/1977 | Germany . |
| 58-172647 | 10/1983 | Japan . |
| 1-213652 | 8/1989 | Japan . |
| 3-259247 | 11/1991 | Japan . |
| 4331952 | 11/1992 | Japan . |

*Primary Examiner*—Janet C. Baxter
*Attorney, Agent, or Firm*—Arthur E. Kluegel

[57] ABSTRACT

The invention provides a photographic element comprising a support bearing a light-sensitive photographic silver halide layer having associated therewith a masking coupler comprising:

(1) a parent group containing a -1-phenyl-3-anilinopyrazolin-5-one having electron-withdrawing substituents on the phenyl and anilino rings of a type and number sufficient to provide a combined Hammett sigma(para) value for such substituents of at least 1.4;

(2) a coupling-off group at the 4 position of the pyrazolone of the parent group comprising an arylazo dye containing on the aryl ring the following:

(A) a substituent para to the azo functionality selected from the group consisting of hydroxyl, and alkoxy, carbonamido, and sulfonamido, each unsubstituted or substituted with nonaromatic groups, and (B) "n" additional substituents selected from the group consisting of alkyl, alkoxy, carbonamido, and sulfonamido, unsubstituted or substituted with nonaromatic groups, where "n" is 0 to 4;

provided that substituent (A) and a substituent (B) may form a ring wherein one of the substituents (A) or (B) contains an alkyl group of at least 8 carbon atoms, unsubstituted or substituted with nonaromatic substituents, and said substituent contains at least 70% of the saturated carbon atoms in all of the substituents (A) and (B) provided that where the substituent (A) forms a ring with a substituent (B), the entire ring will be counted as said one of the substituents which contains an alkyl group of at least 8 carbon atoms for purposes of satisfying the 70% requirement.

33 Claims, No Drawings

AZOPYRAZOLONE MASKING COUPLERS

CROSS REFERENCE TO RELATED APPLICATION

This application is a Continuation-in-Part of U.S. Ser. No. 07/996,228 filed Dec. 23, 1992, now abandoned.

FIELD OF THE INVENTION

This invention relates to the art of masked photographic elements which correct for unwanted absorption in color negative film. More particularly, it relates to such elements and couplers which exhibit mass efficiency, do not substantially increase fogging or reduce maximum density, and have improved masking efficiency.

BACKGROUND OF THE INVENTION

The use of 4-arylazopyrazolone masking couplers is known in the art. See, for example, U.S. Pat. Nos. 2,455,170; 2,428,034; 2,808,329; 2,434,272; 2,704,711; 2,688,539; 3,796,574; 3,476,560; 4,427,763; EP 213,490; and U.S. Pat. No. 4,777,123 as well as the materials referenced in *Research Disclosure* December 1989, Section VII, Part G, Published by Kenneth Mason Publications, Ltd., Dudley Annex, 12A North Street, Emworth, Hampshire PO10 7DQ, England. These compounds have proven useful since they are yellow colored in nonexposed areas and magenta colored in exposed areas. Thus, while the magenta dye formed in a color negative photographic process has a small but significant unwanted absorption in the blue range, this may be balanced somewhat by the relative loss of blue absorption due to conversion of the mask color from yellow to magenta in the exposed areas. Then, an adjustment can be made to the spectral content of the light used to produce the positive from the negative to effectively cancel out the unwanted blue absorption which has become essentially constant across both the exposed and unexposed areas of the negative.

It is known that certain substituents on the 4-arylazo group are useful. Included are alkoxy, hydroxy, and carbonamido groups, usually in the para position to the azo function. These functions have not been generally associated with any particular feature in the pyrazolone nucleus. It has been customary to include such substituents as will permit or indeed improve the propensity of the decoupled arylazo residue to be washed out of the film during processing.

While 4-arylazopyrazolone masking couplers have been employed as a means of offsetting the unwanted blue absorption of conventional magenta couplers, this means for improving the color rendition has created several other problems in the photographic material. First, the presence of these masking couplers results in increased fogging (silver development at no exposure) of the photographic emulsion. This is thought to be due to reaction during development between the oxidized developer and the masking coupler which results in the formation of an aryldinitrogen species. This species can then act as a powerful reducing agent for silver emulsions. The result is undesired silver development which manifests itself as fog. Thus, the Dmin (minimum density) of the photographic material is undesirably increased due to the presence of this class of masking coupler. This deficiency is amplified even further in the case of processing using extended development times ("push" processing) where due to the extended processing time the extent of fogging is increased even further.

An added deficiency is the loss in Dmax with time during raw stock keeping. Apparently a dinitrogen species is formed which attacks the image coupler and results in a loss in the capacity of the image coupler to be converted to image dye.

A still further deficiency with the 4-arylazopyrazolones is their poor masking efficiency. It is desirable to maximize the differentiation between the yellow of the dye before processing and the magenta of the dye formed upon reaction with oxidized developer. In order to effectively remove blue unwanted density as seen by a sensing element (a printer monitor or photographic paper), the yellow form of the coupler must have as high absorbance as possible in the same regions of blue sensitivity as the receiving element (typically 480 nm for color paper) while minimizing the amount of green absorbance as seen by these same sensors. Conversely, the magenta dye formed from the coupler after reaction with oxidized developer should have as low as possible absorbance in the blue region of receiver sensitivity and as high as possible in the green region. In particular, it is desirable to maximize the difference in absorbance at 480 nm between the yellow colored phenylazopyrazolone and its magenta colored dye formed by the reaction with oxidized coupler. Masking efficiency is also impacted by the reactivity of the coupler. While the addition of electron withdrawing substituents to the parent group might be expected to reduce the activity of the coupler, this effect was not found to be significant in this invention.

Higher masking efficiency couplers allow for reduced laydown of the masking coupler and/or for better color reproduction since the masking coupler has improved absorbance in the desire range and reduced absorbance in the undesired range.

It is also desirable to employ such couplers which exhibit mass efficiency, i.e. achieve the desired photographic properties with use of lower molecular weight materials than heretofore employed, thereby reducing manufacturing, disposal, and recycling costs.

In EP 213,490 there are shown masking couplers having two alkoxy substituents on the arylazo ring. While a parent group having a sigma(para) sum exceeding 1.4 is shown (II-16), such a parent is not shown in combination with an arylazo portion meeting the requirements of this invention and the advantages of the invention are not realized. In a similar manner, Japanese Published Application 58/172,647 shows masking couplers ( e.g. CM-21 to CM-25 ) but the parent does not have the required sigma(para) value and/or the arylazo ring substituents do not meet the requirements specified in this invention and the desired results are not obtained.

It is therefore a problem to provide a masking coupler capable of masking the unwanted blue absorption of a magenta dye which masks more efficiently than the currently employed 4-arylazopyrazolone masking couplers and for which embodiments do not substantially increase fogging or reduce maximum density.

SUMMARY OF THE INVENTION

The invention provides a photographic element comprising a support bearing a light-sensitive photographic silver halide layer having associated therewith a masking coupler comprising:

(1) a parent group containing a -1-phenyl-3-anilinopyrazolin-5-one having electron-withdrawing substituents on the phenyl and anilino rings of a type and number sufficient to provide a combined Hammett sigma(para) value for such substituents of at least 1.4;

(2) a coupling-off group at the 4 position of the pyrazolone of the parent group comprising an arylazo dye containing on the aryl ring the following:

(A) a substituent para to the azo functionality selected from the group consisting of hydroxyl, and alkoxy, carbonamido, and sulfonamido, each unsubstituted or substituted with nonaromatic groups, and (B) "n" additional substituents selected from the group consisting of alkyl, alkoxy, carbonamido, and sulfonamido, unsubstituted or substituted with nonaromatic groups, where "n" is 0 to 4;

provided that substituent (A) and a substituent (B) may form a ring wherein one of the substituents (A) or (B) contains an alkyl group of at least 8 carbon atoms, unsubstituted or substituted with nonaromatic substituents, and said substituent contains at least 70% of the saturated carbon atoms in all of the substituents (A) and (B) provided that where the substituent (A) forms a ring with a substituent (B), the entire ring will be counted as said one of the substituents which contains an alkyl group of at least 8 carbon atoms for purposes of satisfying the 70% requirement.

This invention provides photographic materials, compositions, and processes which provide better color rendition and more efficient materials usage ("mass efficiency") through the utilization of a masking coupler having better masking efficiency while at the same time providing materials which improve or at least do not substantially increase fogging or reduce maximum density.

DETAILED DESCRIPTION OF THE INVENTION

A suitable photographic element of the invention comprises a support bearing a light-sensitive photographic silver halide layer having associated therewith a masking coupler having formula I:

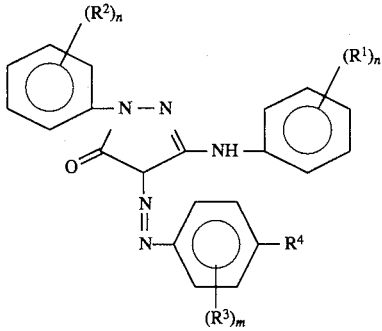

wherein each $R^1$, and $R^2$ is a substituent independently selected so that the combined electron withdrawing strength is sufficient to obtain a Hammett sigma(para) sum for all the $R^1$, and $R^2$ substituents of at least 1.4;

each $R^3$ is selected from the group consisting of alkyl, alkoxy, carbonamido, and sulfonamido, or one or more fused rings, each unsubstituted or substituted with nonaromatic groups;

each n is 0 to 5 and m is 0 to 4;

$R^4$ is independently selected from the group consisting of hydroxyl, and alkoxy, carbonamido, and sulfonamido, each unsubstituted or substituted with nonaromatic groups, where $R^4$ may be connected with $R^3$ to form a ring; and one $R^3$ or $R^4$ group contains an alkyl group of at least 8 carbon atoms and which contains at least 70% of the saturated carbon atoms contained in all of the $R^3$ and $R^4$ groups combined.

Broadly, the substituents $R^1$ and $R^2$ may be any substituent useful for photographic purposes exhibiting a sigma(para) value (as described in *Substituent Constants for Correlation Analysis in Chemistry and Biology*, C. Hansch and A. J. Leo, Wiley, New York, 1979,) such that the combined values of all $R^1$ and $R^2$ substituents is at least 1.4. The substituent groups $R^1$ and $R^2$ may be further defined as follows:

The substituents may include, for example, halogen, such as chlorine, bromine or fluorine; nitro; hydroxyl; cyano; and —$CO_2H$ and its salts; and groups which may or may not be further substituted, such as alkyl, including straight or branched chain alkyl, such as methyl, trifluoromethyl, ethyl, t-butyl, 3-(2,4-di-t-amylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentylphenoxy)acetamido, alpha-(2,4-di-t-pentylphenoxy) butyramido, alpha-(3-pentadecylphenoxy)hexanamido, alpha-(4-hydroxy-3-t-butylphenoxy)tetradecanamido, 2-oxo-pyrrolidin-1-yl, 2-oxo-5-tetradecyl-pyrrolin-1N-methyl-tetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecylphenylcarbonylamino, p-toluylcarbonylamino, N-methylureido, N,N-dimethylureido, N-methyl-N-dodecylureido, N-hexadecylureido, N,N-dioctadecylureido, N,N-dioctyl-N'-ethyl-ureido, N-phenylureido, N,N-diphenylureido, N-phenyl-N-p-toluylureido, N-(m-hexadecylphenyl)ureido, N,N-(2,5-di-t-pentylphenyl)-N'-ethyl-ureido; and t-butylcarbonamido; sulfonamido, such as methylsulfonamido, benzenesulfonamido, p-toluylsulfonamido, p-dodecyl-benzenesulfonamido, N-methyltetradecylsulfonamido, N,N-dipropylsulfamoylamino, and hexadecylsulfonamido; sulfamoyl, such as N-methylsulfamoyl, N-ethylsulfamoyl,N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]-sulfamoyl, N-methyl-N-tetradecylsulfamoyl, and N-dodecylsulfamoyl; carbamoyl, such as N-methylcarbamoyl, N,N-dibutylcarbamoyl, N-octadecyl-carbamoyl, N-[4-(2,4-di-t-pentylphenoxy)butyl]carbamoyl, N-methyl-N-tetradecylcarbamoyl, and N,N-dioctyl-carbamoyl; acyl, such as acetyl, (2,4-di-t-amylphenoxy)acetyl, phenoxycarbonyl, p-dodecyl-oxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexyl-sulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as dieethyl and dihexylphosphite; azo, such as phenylazo and naphthylazo; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

The particular substituents used may be selected to attain the desired photographic properties for a specific application and can include, for example, hydrophobic groups, solubilizing groups, blocking groups, etc. Generally, the above groups and substituents thereof may typically include those having 1 to 30 carbon atoms and usually less than 24 carbon atoms, but greater numbers are possible depending on the particular substituents selected. Moreover, as indicated the substituents may themselves be suitably substituted with any of the above group.

As stronger electron-withdrawing groups that might be used for $R^1$ or $R^2$, examples include nitro, carbonyl (such as acetyl or benzoyl), sulfoxide, electron deficient heterocycles such as pyridine, chloride, bromide, sulfamoyl, trifluoromethyl, trifluorosulfonyl, cyano, carboxyl, carbamoyl, sulfonyl, sulfinyl, oxysulfonyl, and acyloxy. Most preferred are chloride, and substituted or unsubstituted sulfamoyl, sulfone, carbamoyl, carboxylic acid, ester, trifluoromethyl, carbonamido, and cyano groups. If desired, these groups may contain a ballast and may be further substituted.

Electron withdrawing groups are present in either or both the N-phenyl and the anilino rings and either one or both rings may contain more than one such group. One suitable structure for the anilino ring contains a chloro or alkoxy group ortho to and an electron withdrawing group meta or para to the anilino nitrogen.

By way of example, the electron withdrawing bathoshifted parents (BP) shown in Table I may be used in the invention:

TABLE I

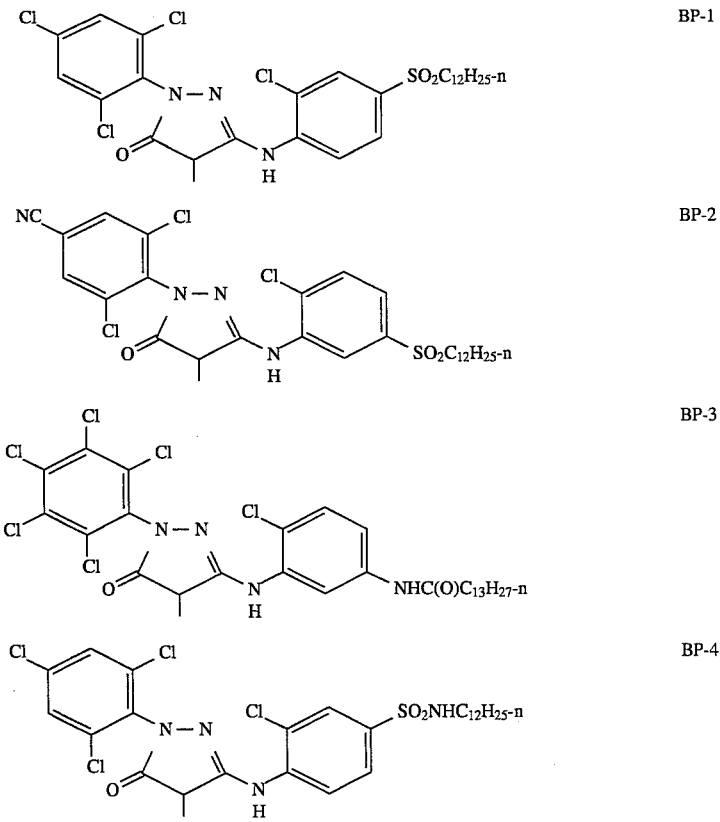

TABLE I-continued
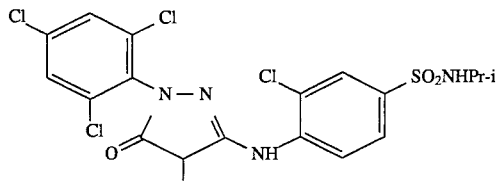 BP-5
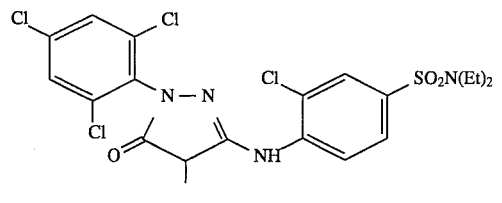 BP-6
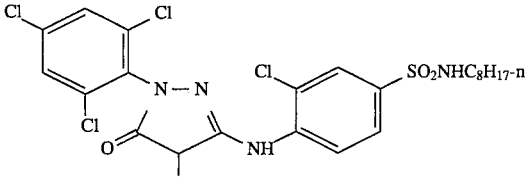 BP-7
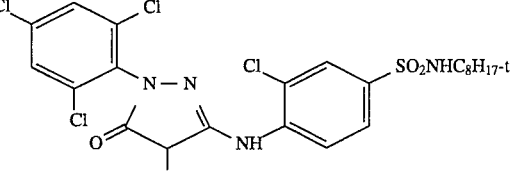 BP-8
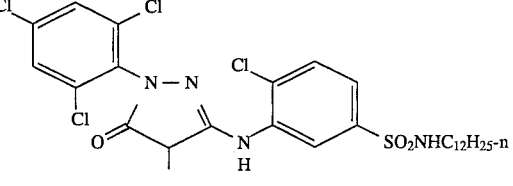 BP-9
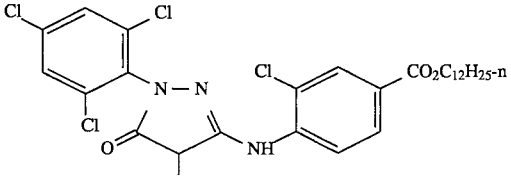 BP-10
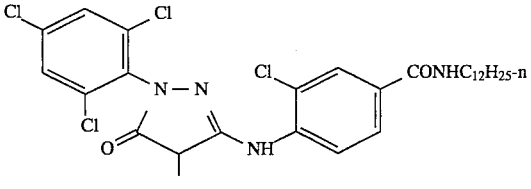 BP-11
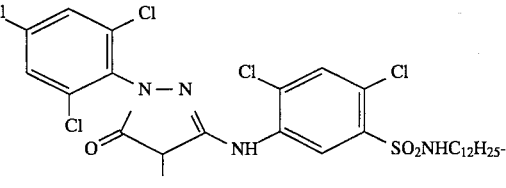 BP-12

TABLE I-continued

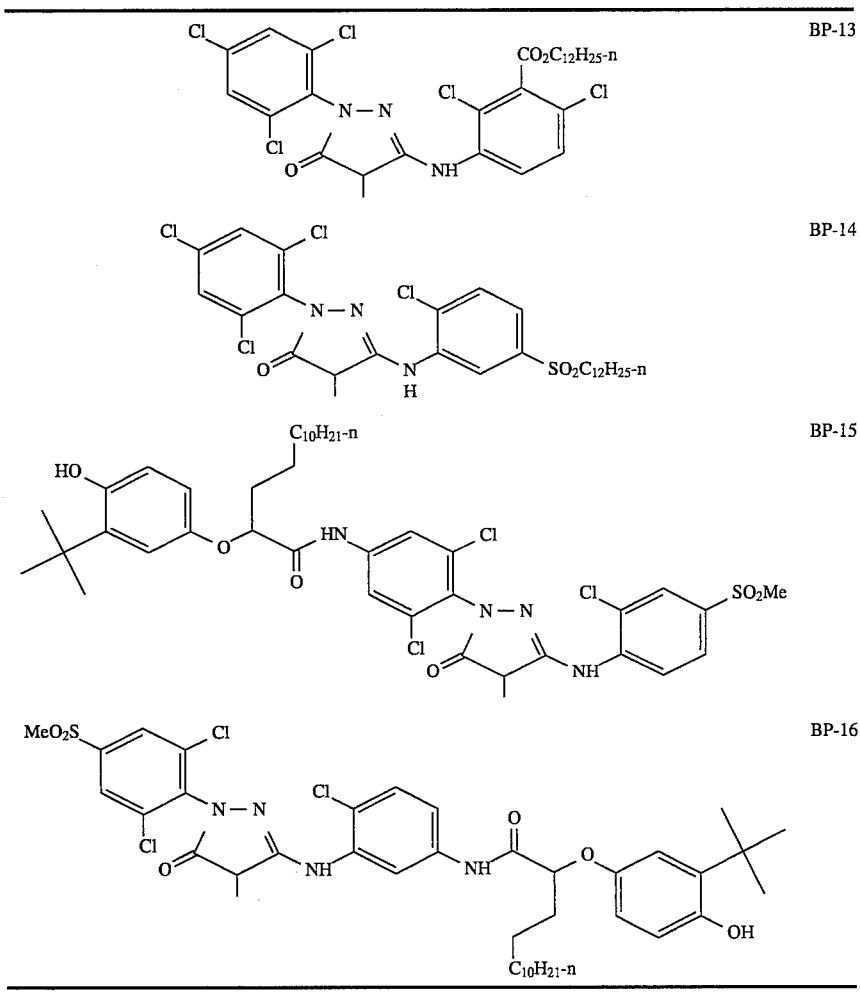

As described above, the arylazo group is typically a phenyl or naphthyl group. There must be present an $R^4$ substituent para to the azo group and there are optionally present one or more $R^3$ groups. Preferably, the $R^4$ group is hydroxy, alkoxy, carbonamido or sulfonamido group. The alkoxy group is typically one containing up to 16 carbon atoms and may be straight or branch chained. Isopropoxy is one particularly useful example. When the $R^4$ substituent is a carbonamido or sulfonamido, the third nitrogen bond may be satisfied by hydrogen or a further substituent as defined for $R^1$ and $R^2$. Typically, primary, secondary, and tertiary alkyl substituents may be employed with t-butyl being very useful.

$R^3$, if present, may be alkyl, alkoxy, carbonamido or sulfonamido, or may constitute one or more annulated rings. The ranges of suitable substituents for these groups are not particularly limited and may be as described above. Some useful preferred examples are straight and branch chained primary, secondary and tertiary alkyl and alkoxy groups. Particularly preferred are those containing 1–16 carbon atoms such as isopropoxy.

By further example, the following azo groups (AZ) are useful in the invention:

TABLE II

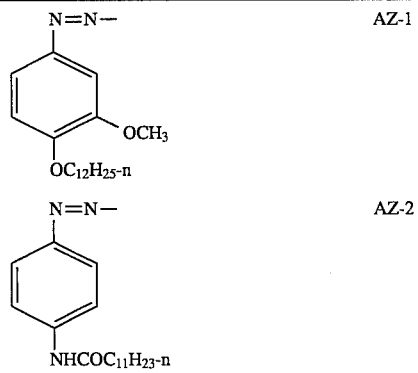

TABLE II-continued
| | |
|---|---|
| 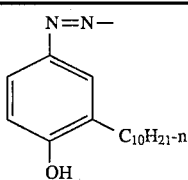 | AZ-3 |
| 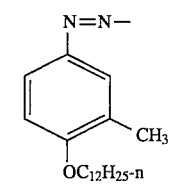 | AZ-4 |
| 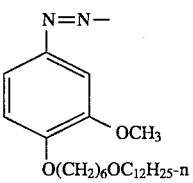 | AZ-5 |
| 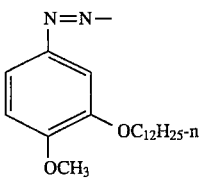 | AZ-6 |
| 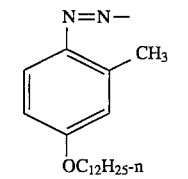 | AZ-7 |
| 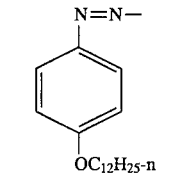 | AZ-8 |
| 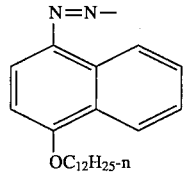 | AZ-9 |
| 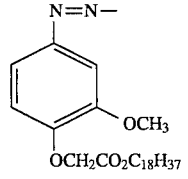 | AZ-10 |
| 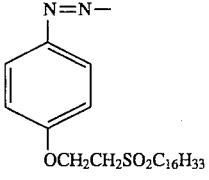 | AZ-11 |
TABLE II-continued
| | |
|---|---|
| 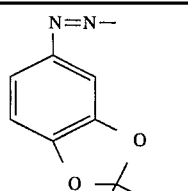 | AZ-12 |
| 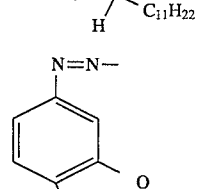 | AZ-13 |
| 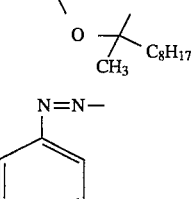 | AZ-14 |
| 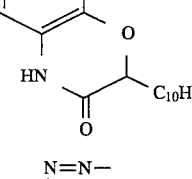 | AZ-15 |
| 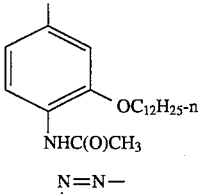 | AZ-16 |
| 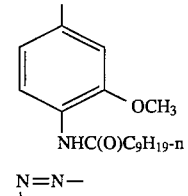 | AZ-17 |
| 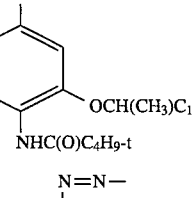 | AZ-18 |
| 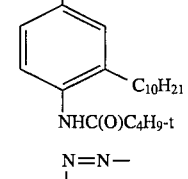 | AZ-19 |

TABLE II-continued

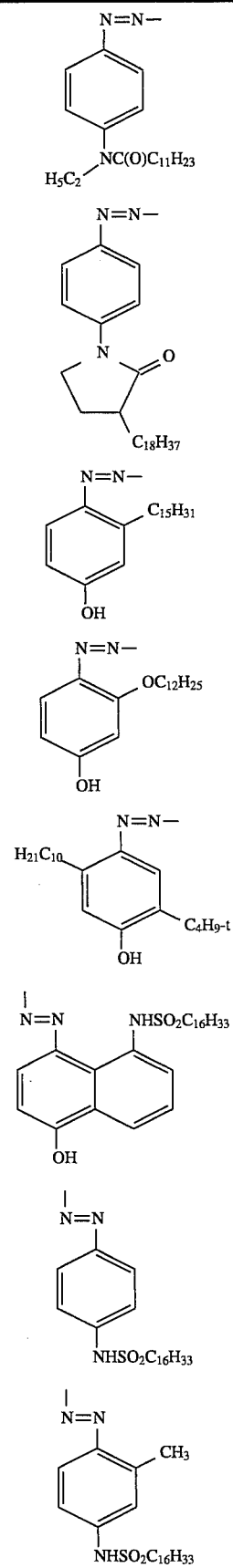

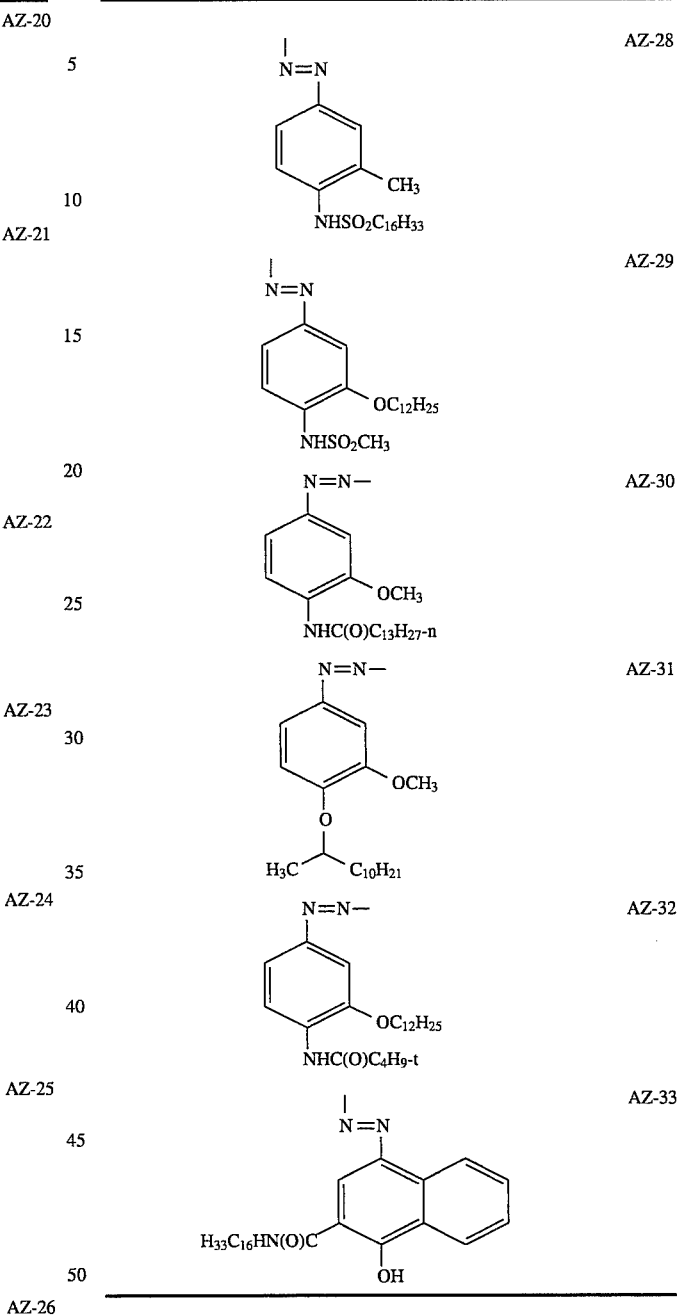

Obtaining acceptable results with masking couplers depends on obtaining a desirable balance between the hydrophilic and lipophilic properties of the coupler. This is important in order to prevent the arylazo group from migrating during raw stock keeping or during processing and thereby deleteriously reacting with the silver or image coupler. As is well-known in the art, the Log P is a measure of the balance of these properties. The coupler is allowed to partition itself between water and an organic phase such as octanol and the result is expressed as the log of the partition coefficient or Log P. These values may be calculated as described in U.S. Pat. No. 4,782,012. It has been discovered as part of this invention that the Log P is not sufficient to define the needed hydrophobicity. The presence of a single ballast (lipophilic group) which accounts for 70% or more of the saturated carbons in the aryl ring substituents results in improved raw stock keeping while at the same time reducing the need for hydrophobicity in the other aryl ring substituents.

As used herein, the fog is said to be significantly increased to an undesirable extent if the Delta Fog Increase, as defined in the examples, exceeds 0.05. The maximum density is said to be significantly reduced to an undesirable extent if the "Loss in Dmax Density", as defined in the examples, is more negative than −0.1.

In one embodiment of the invention, the photographic layers are coated on a substrate in combination with a magnetic layer as described in the Research Disclosure referenced hereafter. The greater masking efficiency of the coupler of the invention affords advantages by reducing the overall effect of the undesired blue absorption occasioned by the magnetic layer by enabling the use of lesser amounts of masking coupler due to the increased masking and mass efficiency. This, in turn, can reduce the required printing time.

Synthesis of the masking couplers of the invention may be generally carried out in the same manner as well known in the art as described in the patents described in the background and as more fully exemplified in the synthesis examples herein.

The masking coupler of this invention can be used in any of the ways and in any of the combinations in which such couplers are used in the photographic art. Typically, a masking coupler is incorporated in a silver halide emulsion along with other couplers and coated on a support to form part of a photographic element. Alternatively, the coupler can be incorporated at a location adjacent to the silver halide emulsion where, during development, the coupler will be in reactive association with development products such as oxidized color developing agent. Thus, as used herein, the term "associated" signifies that the coupler is in the silver halide emulsion layer or in an adjacent location where, during processing, the coupler is capable of reacting with silver halide development products.

The photographic elements can be single color elements or multicolor elements. Multicolor elements contain dye image-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In a alternative format, the emulsions sensitive to each of the three primary regions of the spectrum can be disposed as a single segmented layer.

A typical multicolor photographic element comprises a support bearing a cyan dye image-forming unit comprising at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler, at least one of the couplers in the element being a masking coupler of this invention. The element can contain additional layers, such as filter layers, interlayers, overcoat layers, subbing layers, and the like.

If desired, the photographic element can be used in conjunction with an applied magnetic layer as described in Research Disclosure, November 1992, Item 34390 published by Kenneth Mason Publications, Ltd., Dudley Annex, 12a North Street, Emsworth, Hampshire P010 7DQ, ENGLAND.

In the following discussion of suitable materials for use in the emulsions and elements of this invention, reference will be made to Research Disclosure, December 1989, Item 308119, published by Kenneth Mason Publications, Ltd., Dudley Annex, 12a North Street, Emsworth, Hampshire P010 7DQ, ENGLAND, which will be identified hereafter by the term "Research Disclosure." The contents of the Research Disclosure, including the patents and publications referenced therein, are incorporated herein by reference, and the Sections hereafter referred to are Sections of the Research Disclosure.

The silver halide emulsions employed in the elements of this invention can be either negative-working or positive-working. Suitable emulsions and their preparation as well as methods of chemical and spectral sensitization are described in Sections I through IV. Color materials and development modifiers are described in Sections V and XXI. Vehicles are described in Section IX, and various additives such as brighteners, antifoggants, stabilizers, light absorbing and scattering materials, hardeners, coating aids, plasticizers, lubricants and matting agents are described, for example, in Sections V, VI, VIII, X, XI, XII, and XVI. Manufacturing methods are described in Sections XIV and XV, other layers and supports in Sections XIII and XVII, processing methods and agents in Sections XIX and XX, and exposure alternatives in Section XVIII.

Preferred color developing agents are p-phenylenediamines. Especially preferred are:

4-amino N,N-diethylaniline hydrochloride, 4-amino-3-methyl-N,N-diethylaniline hydrochloride, 4-amino-3-methyl-N-ethyl-N-(b-(methanesulfonamido)ethyl)aniline sesquisulfate hydrate, 4-amino-3-methyl-N-ethyl-N-(b-hydroxyethyl)aniline sulfate, 4-amino-3-b-(methanesulfonamido)ethyl-N,N-diethylaniline hydrochloride and 4-amino-N-ethyl-N-(2-methoxyethyl)-m-toluidine di-p-toluene sulfonic acid.

With negative working silver halide a negative image can be formed. The masking coupler can be used in combination with other couplers having functional coupling-off groups. Coupling-off groups are well known in the art. Such groups can determine the equivalency of the coupler, i.e., whether it is a 2-equivalent or a 4-equivalent coupler, or modify the reactivity of the coupler. Such groups can advantageously affect the layer in which the coupler is coated, or other layers in the photographic recording material, by performing, after release from the coupler, functions such as dye formation, development acceleration or inhibition, bleach acceleration or inhibition, electron transfer facilitation, color correction and the like.

Representative classes of coupling-off groups include chloro, alkoxy, aryloxy, heteroyloxy, sulfonyloxy, acyloxy, acyl, heterocyclyl, sulfonamido, mercaptotetrazole, mercaptopropionic acid, phosphonyloxy anylthio, and arylazo. These coupling-off groups are described in the art, for example, in U.S. Pat. Nos. 2,455,169, 3,227,551, 3,432,521, 3,476,563, 3,617,291, 3,880,661, 4,052,212 and 4,134,766; and in U.K. Patents and published application Nos. 1,466,728, 1,531,927, 1,533,039, 2,006,755A and 2,017,704A, the disclosures of which are incorporated herein by reference.

The coupler described herein may be used in combination with other types of couplers such as enamines, 3-acylamino- or 3-anilino-5-pyrazolones and heterocyclic couplers (e.g.

pyrazoloazoles) such as those described in EP 285,274; U.S. Pat. No. 4,540,654; EP 119,860, or with other 5-pyrazolone couplers containing different ballasts or coupling-off groups such as those described in U.S. Pat. No. 4,301,235; 4,853, 319 and 4,351,897. The two most common types of pyrazolo couplers are the 1H pyrazolo [1,5-b][1,2,4]triazole and the 1H [3,2-c][1,2,4] triazole. The coupler may also be used in association with yellow or cyan colored couplers (e.g. to adjust levels of interlayer correction) and with other masking couplers such as those described in EP 213.490; Japanese Published Application 58-172,647; U.S. Pat. No. 2,983, 608; German Application DE 2,706,117C; U.K. Patent 1,530,272; Japanese Application A-113935; U.S. Pat. No. 4,070,191 and German Application DE 2,643,965. The masking couplers may be shifted or blocked.

For example, the coupler of the invention may be included in the magenta layer or may be added to one or more of the other layers in a color negative photographic element comprising a support bearing the following layers from top to bottom:

(1) one or more overcoat layers containing ultraviolet absorber(s);

(2) a two-coat yellow pack with a fast yellow layer containing "Coupler 1": Benzoic acid, 4-chloro-3-((2-(4-ethoxy-2,5-dioxo-3-(phenylmethyl)-1-imidazolidinyl)-3-(4-methoxyphenyl)-1,3-dioxopropyl)amino)-, dodecyl ester and a slow yellow layer containing the same compound together with "Coupler 2": Propanoic acid, 2-[[5-[[4-[2-[[[2,4-bis(1,1-dimethylpropyl)phenoxy]acetyl]amino]-5-[( 2,2,3,3,4,4,4-heptafluoro-1-oxobutyl)amino]-4-hydroxyphenoxy]-2,3-dihydroxy-6-[(propylamino)carbonyl]phenyl]thio]-1,3,4-thiadiazol-2-yl]thio]-, methyl est and "Coupler 3": 1-((dodecyloxy)carbonyl) ethyl(3-chloro-4-((3-(2-chloro-4-((1-tridecanoylethoxy) carbonyl)anilino)-3-oxo-2-((4)(5)(6)-(phenoxycarbonyl)-1H-benzotriazol-1-yl)propanoyl)amino))benzoate;

(3) an interlayer containing fine metallic silver;

(4) a triple-coat magenta pack with a fast magenta layer containing "Coupler 4": Benzamide, 3-((2-(2,4-bis(1, 1-dimethylpropyl)phenoxy)-1-oxobutyl)amino)-N-(4, 5-dihydro-5-oxo-1-(2,4,6-trichlorophenyl)-1H-pyrazol-3-yl)-, "Coupler 5": Benzamide, 3-((2-(2,4-bis(1,1-dimethylpropyl)phenoxy)-1-oxobutyl)amino)-N-(4',5'-dihydro-5'-oxo-1'-(2,4,6-trichlorophenyl) (1,4'-bi-1H-pyrazol)-3'-yl)-, "Coupler 6": Carbamic acid, (6-(((3-(dodecyloxy)propyl)amino)carbonyl)-5-hydroxy-1-naphthalenyl)-, 2-methylpropyl ester , "Coupler 7": Acetic acid, ((2-((3-(((3-(dodecyloxy)propyl)amino) carbonyl)-4-hydroxy-8-(((2-methylpropoxy)carbonyl) amino) -1-naphthalenyl)oxy)ethyl)thio)-, and "Coupler 8" Benzamide, 3-((2-(2,4-bis (1,1-dimethylpropyl) phenoxy) -1-oxobutyl)amino)-N-(4,5-dihydro-4-((4-methoxyphenyl)azo)-5-oxo-1-(2,4,6-trichlorophenyl)-1H-pyrazol-3-yl)-; a mid-magenta layer and a slow magenta layer each containing "Coupler 9": 2-Propenoic acid, butyl ester, styrene , 2:1:1 polymer with (N[1-(2,4,6-trichlorophenyl)-4,5-dihydro-5-oxo-1H-pyrazol-3-yl]-2-methyl-2-propenamide)$_2$ and "Coupler 10": Tetradecanamide, N-(4-chloro-3-((4-((4-((2,2-dimethyl-1-oxopropyl)amino)phenyl)azo)-4,5-dihydro-5-oxo-1-(2,4,6-trichlorophenyl)-1H-pyrazol-3-yl)amino)phenyl)-, in addition to Couplers 3 and 8;

(5) an interlayer;

(6) a triple-coat cyan pack with a fast cyan layer containing Couplers 6 and 7; a mid-cyan containing Coupler 6 and "Coupler 11": 2,7-Naphthalenedisulfonic acid, 5-(acetylamino)-3-((4-(2-((3-(((3-(2,4-bis(1,1-dimethylpropyl)phenoxy) propyl)amino)carbonyl)-4-hydroxy-1-naphthalenyl) oxy)ethoxy)phenyl)azo)-4-hydroxy-, disodium salt; and a slow cyan layer containing Couplers 2 and 6;

(7) an undercoat layer containing Coupler 8; and (8) an antihalation layer.

The couplers may also be used in association with materials that accelerate or otherwise modify the processing steps e.g. of bleaching or fixing to improve the quality of the image. Bleach accelerators described in EP 193,389; EP 301,477; U.S. Pat. Nos. 4,163,669; 4,865,956; and 4,923, 784 are particularly useful. Also contemplated is use of the coupler in association with nucleating agents, development accelerators or their precursors (UK Patent 2,097,140; U.K. Patent 2,131,188); electron transfer agents (U.S. Pat. Nos. 4,859,578; 4,912,025); antifogging and anti color-mixing agents such as derivatives of hydroquinones, aminophenols, amines, gallic acid; catechol; ascorbic acid; hydrazides; sulfonamidophenols; and non color-forming couplers.

The couplers may also be used in combination with filter dye layers comprising colloidal silver sol or yellow and/or magenta filter dyes, either as oil-in-water dispersions, latex dispersions or as solid particle dispersions. Additionally, they may be used with "smearing" couplers (e.g. as described in U.S. Pat. No. 4,366,237; EP 96,570; U.S. Pat. Nos. 4,420,556; and 4,543,323.) Also, the couplers may be blocked or coated in protected form as described, for example, in Japanese Application 61/258,249 or U.S. Pat. No. 5,019,492.

The coupler may further be used in combination with image-modifying compounds such as "Developer Inhibitor-Releasing" compounds (DIR's). DIR's useful in conjunction with the couplers of the invention are known in the art and examples are described in U.S. Pat. No. Nos. 3,137,578; 3,148,022; 3,148,062; 3,227,554; 3,384,657; 3,379,529; 3,615,506; 3,617,291; 3,620,746; 3,701,783; 3,733,201; 4,049,455; 4,095,984; 4,126,459; 4,149,886; 4,150,228; 4,211,562; 4,248,962; 4,259,437; 4,362,878; 4,409,323; 4,477,563; 4,782,012; 4,962,018; 4,500,634; 4,579,816; 4,607,004; 4,618,571; 4,678,739; 4,746,600; 4,746,601; 4,791,049; 4,857,447; 4,865,959; 4,880,342; 4,886,736; 4,937,179; 4,946,767; 4,948,716; 4,952,485; 4,956,269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346,899; 362,870; 365, 252; 365,346; 373,382; 376,212; 377,463; 378,236; 384, 670; 396,486; 401,612; 401,613.

Such compounds are also disclosed in "Developer-Inhibitor-Releasing (DIR) Couplers for Color Photography," C. R. Barr, J. R. Thirtle and P. W. Vittum in *Photographic Science and Engineering*, Vol. 13, p. 174 (1969), incorporated herein by reference. Generally, the developer inhibitor-releasing (DIR) couplers include a coupler moiety and an inhibitor coupling-off moiety (IN). The inhibitor-releasing couplers may be of the time-delayed type (DIAR couplers) which also include a timing moiety or chemical switch which produces a delayed release of inhibitor. Examples of typical inhibitor moieties are: oxazoles, thiazoles, diazoles, triazoles, oxadiazoles, thiadiazoles, oxathiazoles, thiatriazoles, benzotriazoles, tetrazoles, benzimidazoles, indazoles, isoindazoles, mercaptotetrazoles, selenotetrazoles, mercaptobenzothiazoles, selenobenzothiazoles, mercaptobenzoxazoles, selenobenzoxazoles, mercaptobenzimidazoles, selenobenzimidazoles, benzodiazoles, mercaptooxazoles, mercaptothiadiazoles, mercaptothiazoles, mercaptotriazoles, mercaptooxadiazoles, mercaptodiazoles, mercaptooxathiazoles, telleurotetrazoles or benzisodiazoles. In a preferred embodiment, the inhibitor moiety or group is selected from the following formulas:

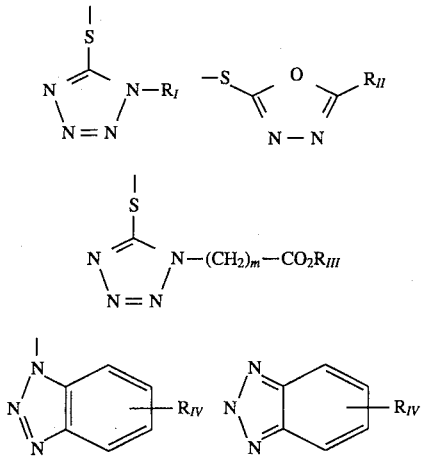

wherein $R_I$ is selected from the group consisting of straight and branched alkyls of from 1 to about 8 carbon atoms, benzyl and phenyl groups and said groups containing at least one alkoxy substituent; $R_{II}$ is selected from $R_I$ and —$SR_I$; $R_{III}$ is a straight or branched alkyl group of from 1 to about 5 carbon atoms and m is from 1 to 3; and $R_{IV}$ is selected from the group consisting of hydrogen, halogens and alkoxy, phenyl and carbonamido groups, —$COOR_V$ and —NHCO-$OR_V$ wherein $R_V$ is selected from substituted and unsubstituted alkyl and aryl groups.

Although it is typical that the coupler moiety included in the developer inhibitor-releasing coupler forms an image dye corresponding to the layer in which it is located, it may also form a different color as one associated with a different film layer. It may also be useful that the coupler moiety included in the developer inhibitor-releasing coupler forms colorless products and/or products that wash out of the photographic material during processing (so-called "universal" couplers).

As mentioned, the developer inhibitor-releasing coupler may include a timing group which produces the time-delayed release of the inhibitor group such as groups utilizing the cleavage reaction of a hemiacetal (U.S. Pat. No. 4,146,396, Japanese Applications 60-249148; 60-249149); groups using an intramolecular nucleophilic substitution reaction (U.S. Pat. No. 4,248,962); groups utilizing an electron transfer reaction along a conjugated system (U.S. Pat. Nos. 4,409,323; 4,421,845; Japanese Applications 57-188035; 58-98728; 58-209736; 58-209738) groups utilizing ester hydrolysis (German Patent Application (OLS) No. 2,626,315; groups utilizing the cleavage of imino ketals (U.S. Pat. No. 4,546,073); groups that function as a coupler or reducing agent after the coupler reaction (U.S. Pat. Nos. 4,438,193; 4,618,571) and groups that combine the features describe above. It is typical that the timing group or moiety is of one of the formulas:

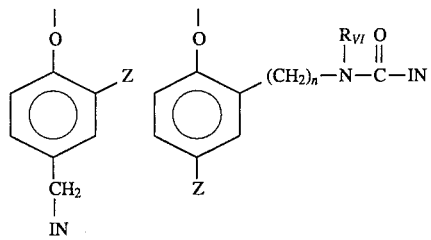

wherein IN is the inhibitor moiety, Z selected from the group consisting of nitro, cyano, alkylsulfonyl; sulfamoyl (—$SO_2NR_2$); and sulfonamido (—$NRSO_2R$) groups; n is 0 or 1; and $R_{VI}$ is selected from the group consisting of substituted and unsubstituted alkyl and phenyl groups. The oxygen atom of each timing group is bonded to the coupling-off position of the respective coupler moiety of the DIAR.

Suitable developer inhibitor-releasing couplers for use in the present invention include, but are not limited to, the following:

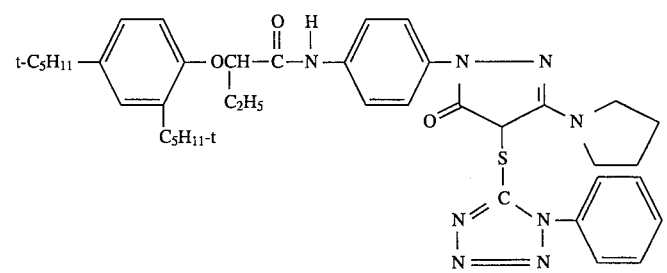

D1

-continued

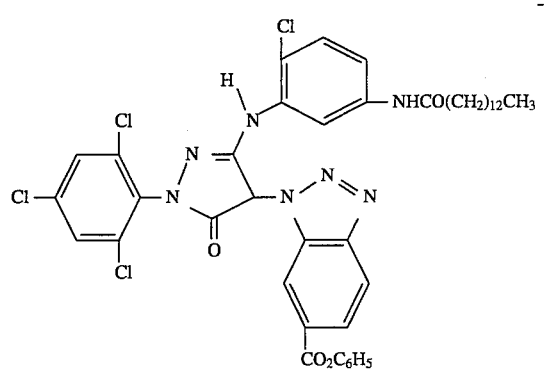
D2

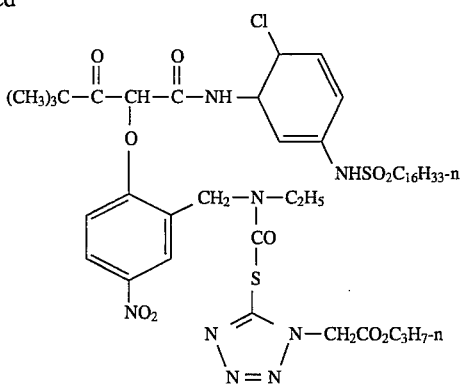
D3

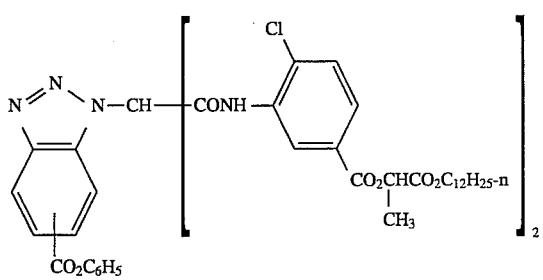
D4

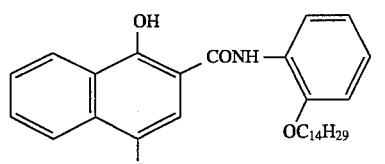

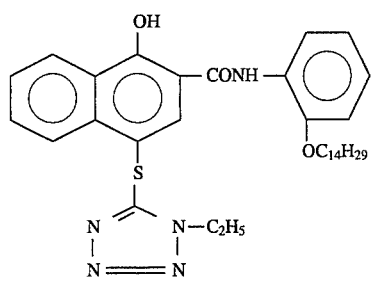
D5

D6

D7

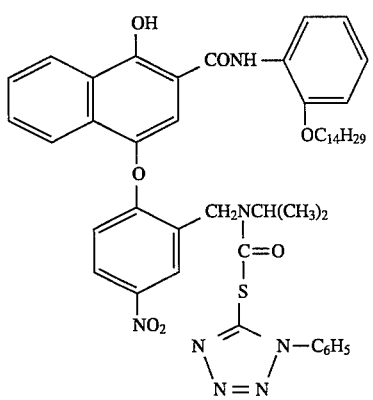
D8

Especially useful in this invention are tabular grain silver halide emulsions. Specifically contemplated tabular grain emulsions are those in which greater than 50 percent of the total projected area of the emulsion grains are accounted for by tabular grains having a thickness of less than 0.3 micron (0.5 micron for blue sensitive emulsion) and an average tabularity (T) of greater than 25 (preferably greater than 100), where the term "tabularity" is employed in its art recognized usage as $$T = ECD/t^2$$

where

ECD is the average equivalent circular diameter of the tabular grains in microns and t is the average thickness in microns of the tabular grains.

The average useful ECD of photographic emulsions can range up to about 10 microns, although in practice emulsion ECD's seldom exceed about 4 microns. Since both photographic speed and granularity increase with increasing ECD's, it is generally preferred to employ the smallest tabular grain ECD's compatible with achieving aim speed requirements.

Emulsion tabularity increases markedly with reductions in tabular grain thickness. It is generally preferred that aim tabular grain projected areas be satisfied by thin (t<0.2 micron) tabular grains. To achieve the lowest levels of granularity it is preferred that aim tabular grain projected areas be satisfied with ultrathin (t<0.06 micron) tabular grains. Tabular grain thicknesses typically range down to about 0.02 micron. However, still lower tabular grain thicknesses are contemplated. For example, Daubendiek et al U.S. Pat. No. 4,672,027 reports a 3 mole percent iodide tabular grain silver bromoiodide emulsion having a grain thickness of 0.017 micron.

As noted above tabular grains of less than the specified thickness account for at least 50 percent of the total grain projected area of the emulsion. To maximize the advantages of high tabularity it is generally preferred that tabular grains satisfying the stated thickness criterion account for the highest conveniently attainable percentage of the total grain projected area of the emulsion. For example, in preferred emulsions tabular grains satisfying the stated thickness criteria above account for at least 70 percent of the total grain projected area. In the highest performance tabular grain emulsions tabular grains satisfying the thickness criteria above account for at least 90 percent of total grain projected area.

Suitable tabular grain emulsions can be selected from among a variety of conventional teachings, such as those of the following: *Research Disclosure*, Item 22534, January 1983, published by Kenneth Mason Publications, Ltd., Emsworth, Hampshire P010 7DD, England; U.S. Pat. Nos. 4,439,520; 4,414,310; 4,433,048; 4,643,966; 4,647,528; 4,665,012; 4,672,027; 4,678,745; 4,693,964; 4,713,320; 4,722,886; 4,755,456; 4,775,617; 4,797,354; 4,801,522; 4,806,461; 4,835,095; 4,853,322; 4,914,014; 4,962,015; 4,985,350; 5,061,069 and 5,061,616.

The emulsions can be surface-sensitive emulsions, i.e., emulsions that form latent images primarily on the surfaces of the silver halide grains, or internal latent images predominantly in the interior of the silver halide grains. The emulsions can be negative-working emulsions, such as surface-sensitive emulsions or unfogged internal latent image-forming emulsions.

Photographic elements can be exposed to actinic radiation, typically in the visible region of the spectrum, to form a latent image and then processed to form a visible dye image. Processing to form a visible dye image includes the step of contacting the element with a color developing agent to reduce developable silver halide and oxidize the color developing agent. Oxidized color developing agent in turn reacts with the coupler to yield a dye.

With negative-working silver halide, the processing step described above provides a negative image. The described elements can be processed in the known C-41 color process as described in, for example, the British Journal of Photography Annual of 1982, pages 209–211 and 1988, pages 191–198.

Development is followed by the conventional steps of bleaching, fixing, or bleach-fixing, to remove silver or silver halide, washing, and drying.

EXAMPLES

Synthesis

Azopyrazolone couplers of this invention were synthesized by methods generally known in the chemical art e.g. in U.S. Pat. Nos. 4,277,559, 4,163,670, and 4,070,191.

Illustrative examples include the following three couplers:

Synthesis Example 1

Coupler Combination BP-2/AZ-1.

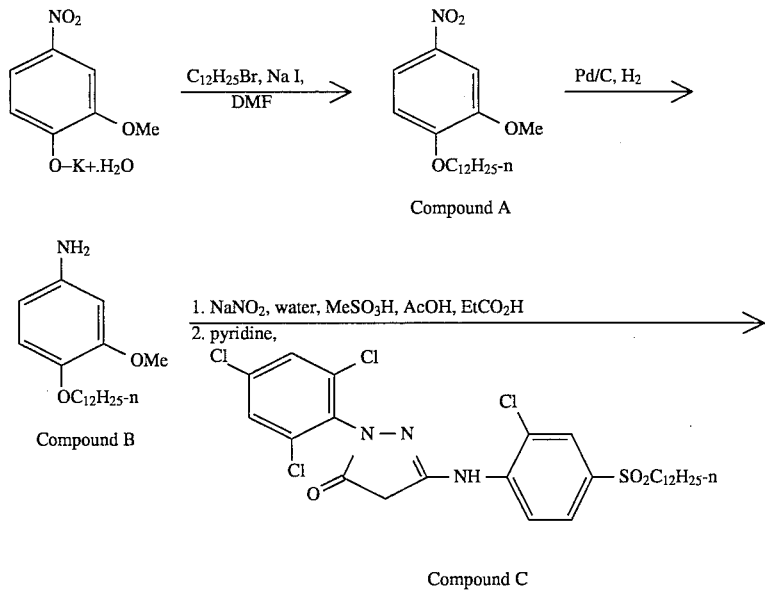

-continued

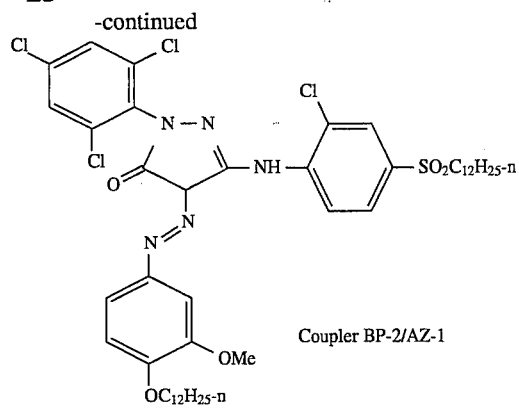

Coupler BP-2/AZ-1

A solution of 4-nitroguaiacol potassium salt hydrate (Aldrich, 25 g, 120 mmol), docecyl bromide (Kodak, 31 mL, 120 mmol) and sodium iodide (Baker, 1 g) in 75 mL of 1-methyl-2-pyrrolidinone (Kodak) was heated at 100° C. for 3 hours. The solution was cooled to room temperature and poured slowly into 2 L of ice cold water with efficient stirring. A solid formed, which was collected and washed with 1 L of water and then dried. The resulting solid was washed with low boiling petroleum ether (500 mL) and dried in vacuo at 45° C. for 18 hours to provide 33.2 G (82% yield) of Compound A as a light yellow solid, mp 52°–53° C.

A mixture of Compound A (49.6 g, 147 mmol) and 10% palladium on carbon (Kodak, 2.5 g) in ethyl acetate (120 mL) and methanol (100 mL) was shaken under an atmosphere of hydrogen at 50 psi pressure for 18 hours. The mixture was filtered through a pad of Celite and the filtrate was evaporated in vacuo to provide 45 g (99% yield) of Compound B as a white solid.

Methane sulfonic acid (Kodak, 3.5 mL, 52.5 mmol) was added to a solution of Compound B (5.6 g, 18 mmol) in tetrahydrofuran (THF) (5 mL), acetic acid (20 mL) and water (5 mL). On cooling to 0°–5° C. a thick slurry was formed. A solution of sodium nitrite (Baker, 1.3 g, 18.5 mmol) in water was added at 0°–5° C. over 5 minutes; a dark solution formed. After 30 minutes, the diazonium solution was added to Compound C (9.3 g, 15 mmol) in dimethylformamide (30 mL) and pyridine (20 mL) at 5°–10° C. over 40 minutes. A thick orange precipitate formed. The reaction mixture was stirred for 15 minutes at 5°–10° C. and then at room temperature for 1 hour. The solid was collected by filtration and crystallized from ethyl acetate (80 mL) and methanol (200 mL) to provide 13.4 g (95% yield) of Coupler BP-2/AZ-1 as an orange solid.

Synthesis Example 2

Coupler BP-2/AZ-16.

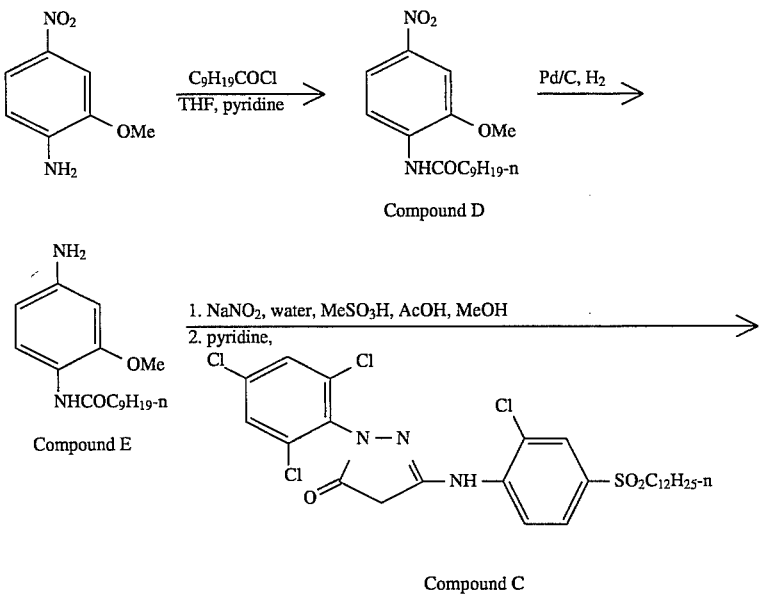

-continued

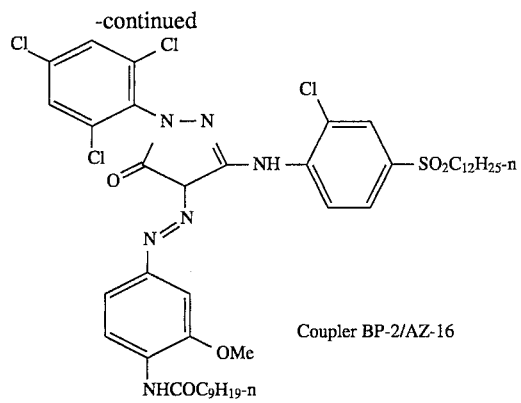

Coupler BP-2/AZ-16

Decanoyl chloride (Kodak, 18.9 g, 99 mmol) was added dropwise to a solution of 2-methoxy-4-nitroaniline (Aldrich, 15 g, 90 mmol) in a mixture of 100 mL of THF and 16 mL of pyridine at room temperature. After 1.5 hours the reaction mixture was poured into 800 mL of 10% aqueous hydrochloric acid (HCl) with efficient stirring. The resulting solid was collected by filtration. The solid was washed with 600 mL of heptane and dried to afford 25.2 g of Compound D as a white solid (87% yield). A mixture of Compound D (16 g, 50 mmol) and 10% palladium on carbon (Kodak, 2.0 g) in ethyl acetate (100 mL) was shaken under an atmosphere of hydrogen at 50 psi pressure for 20 hours. Methanol (100 mL) was added and the mixture was filtered through a pad of Celite and the filtrate was evaporated in vacuo to provide 14.6 g (99% yield) of Compound E as a white solid.

A solution of sodium nitrite (Baker, 3.52 g, 51 mmol) in water (20 mL) was added over 5 minutes to a rapidly stirring mixture of Compound E (14.6 g, 50 mmol) and methane sulfonic acid (Kodak, 6.4 mL, 100 mmol) in acetic acid (150 mL), methanol (150 mL) and water (20 mL) at 0° C. The resulting orange solution was stirred at 0° C. for 35 minutes and then was added dropwise to a solution of. Compound C (27.94 g, 45 mmol) in pyridine (200 mL) at 0° C. over a 20 minute period. After 3 hours the solution was poured into 1.5 L of 5% aqueous HCl. The solution was extracted with ethyl acetate (3×350 mL). The combined organic phases were dried over magnesium sulfate, filtered and the solvent removed to provide 30 g of a red oil. The oil was chromatographed on silica gel with a 50:45:5 mixture of dichloromethane: heptane:ethylacetate and appropriate fractions were combined and evaporated to provide 28 g of a red glass. The glass was disolved in 50 mL of dimethylformamide (DMF) and added dropwise, with efficient stirring, to 2 L of 10% HCl. The resulting orange precipitate was collected and dried to yield 23 g (49%) of Coupler BP-2/AZ-16 as an orange solid.

Synthesis Example 3

Coupler BP-4/AZ-3.

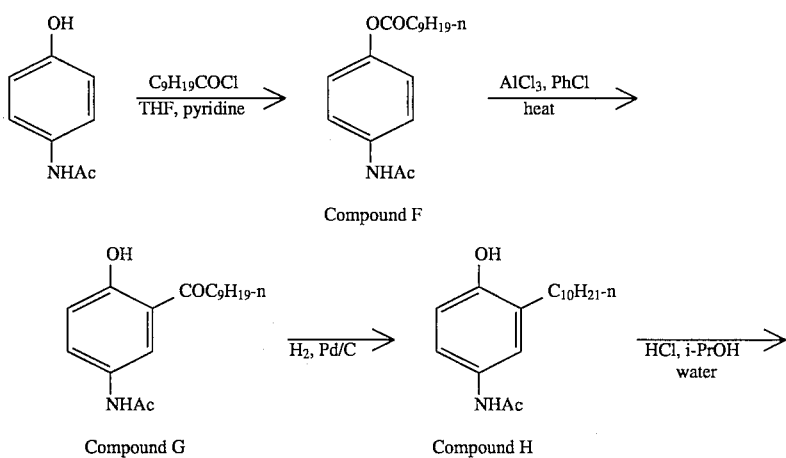

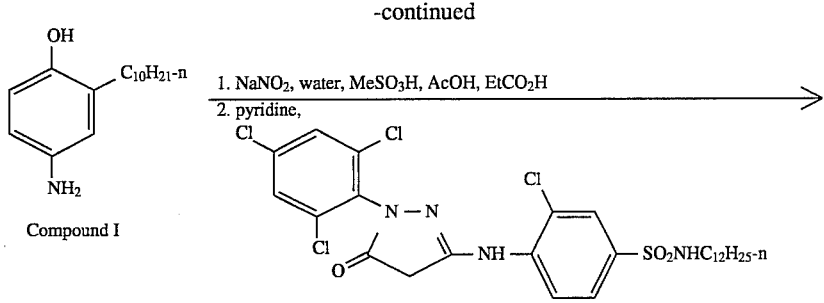

Compound I

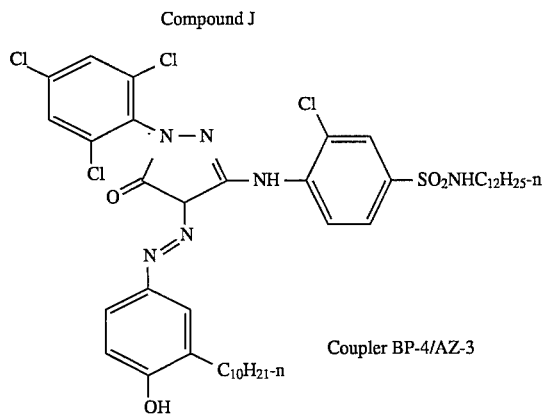

Compound J

Coupler BP-4/AZ-3

Decanoyl chloride (Kodak, 20.5 mL, 100 mmol) was added dropwise over 25 minutes to a solution of 4-hydroxyacetanilide (Kodak, 15.1 g, 100 mmol) in THF (80 mL) and pyridine (8 mL, 100 mmol) at 0° C. with efficient stirring. After 1 hour the reaction mixture was poured into 1 L of 10% HCl with stirring. The white precipitate was collected by filtration. the solid was washed with 200 mL of heptane and dried to provide 19.9 g (65% yield) of Compound F.

Anhydrous aluminum trichloride (Kodak, 8.78 g, 66 mmol) was added to solution of Compound F (9.15 g, 30 mmol) in chlorobenzene (90 mL) and then heated at 130° C. for 18 h. The solution was poured while still hot into 750 mL of ice cold 10% HCl with good stirring. Ethyl acetate (500 mL) was added and the layers separated. The organic phase was dried over magnesium sulfate, filtered and evaporated to afford a tan solid. The solid was crystallized from 6:1 heptane:ethyl acetate (350 mL) to provide 4.03 g (44% yield) of Compound G as off white crystals.

A mixture of Compound G (3.0 g, 10 mmol) 10% palladium on carbon (Kodak, 1.5 g) and methane sulfonic acid (Kodak, 2 mL) in ethanol (100 mL) was shaken under an atmosphere of hydrogen at 50 psi pressure for 24 hours. The mixture was filtered through Celite and the resulting solution was evaporated to 50 mL and poured into 500 mL of water with stirring. A white precipitate was collected and dried to provide 2.2 g (75%) of Compound H as a white solid.

A solution of Compound H (4.2 g, 14.4 mmol) in 2-propanol (80 mL), water (8 mL) and concentrated HCl (4 mL) was heated at reflux for 6 hours. The solution was poured, with good stirring, into 800 mL of water and the pH was adjusted to ca. 7 by addition of sodium bicarbonate. The resulting white precipitate was collected and dried to yield 3.5 g (97%) of Compound I. A solution of Compound I (1.75 g, 7 mmol) in acetic acid (10 mL), propionic acid (2.5 mL) and methane sulfonic acid (1.85 mL) was treated, at 0° C., with a solution of sodium nitrite (Baker, 0.49 g, 7.1 mmol) and the resulting solution was stirred at 0° C. for 35 minutes.

The dark colored solution was then added dropwise over 30 minutes to a rapidly stirring solution of Coumpound J (3.18 g, 5 mmol) in pyridine (60 mL) at 0° C. After 2 hours the orange solution was poured into 1 L of 5% HCl with stirring and an orange precipitate was collected. The precipitate was chromatographed on silica gel by elution with dichloromethane—ethyl acetate mixtures. Appropriate fractions were combined and evaporated to afford 2.5 g of Coupler BP-4/AZ-3 as an orange solid (56% yield).

The four equivalent coupers (Compounds C and J) were synthesized by the methods found in the following references: Item 16736 in Research Disclosure, March 1978; U.S. Pat. Nos. 3,907,571; and 3,928,044.

Photographic Examples and Comparisons

For the examples the following compounds were employed:

Dye Parents (Comparisons)

CP-1:

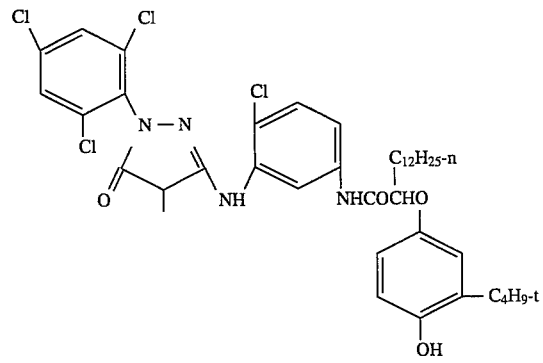

-continued

CP-2:

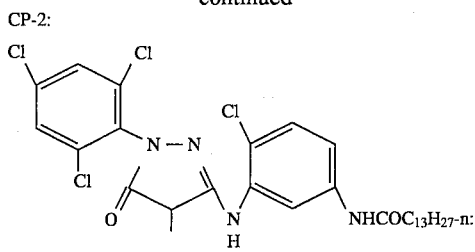

Comparison azo- groups (CAZ) are shown in Table III.

TABLE III

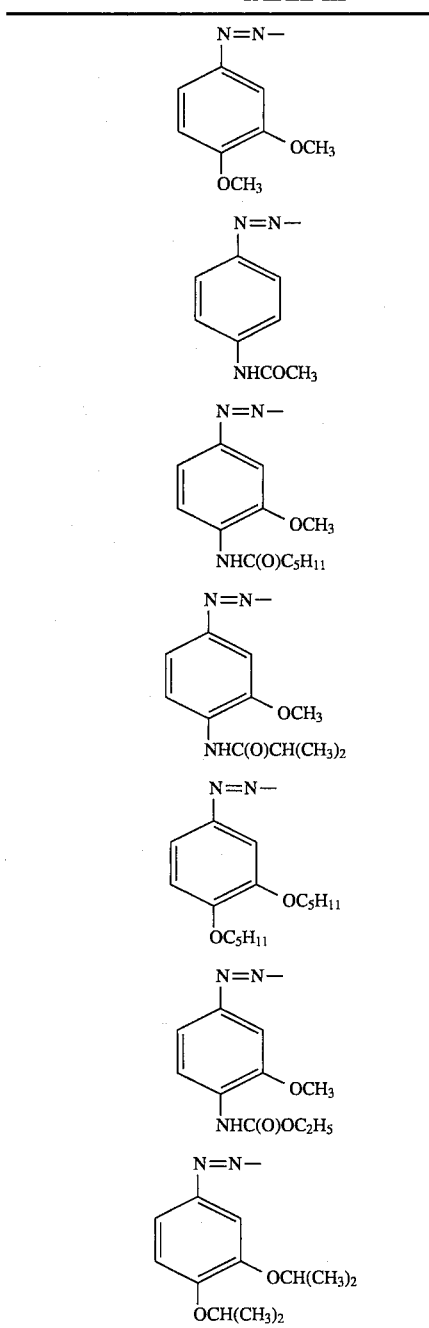

TABLE III-continued

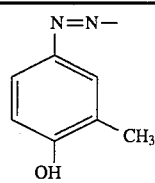          CAZ-8

In the following examples, the image coupler used was represented by the following formula:

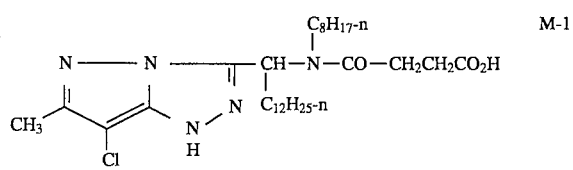          M-1

Examples 1–4

A series of comparative tests were run to demonstrate the advantages of the invention. Samples containing a 1H-pyrazolo[3,2-C][1,2,4] triazole coupler of structure M-1 and masking couplers of various formulas within and outside the scope of the invention were prepared and tested as follows.

Single layer photographic elements were prepared by coating a cellulose acetate-butyrate film support (with a rem-jet antihalation backing) with a photosensitive layer containing a green sensitized bromoiodide emulsion at 1.08 g/m$^2$, gelatin at 3.77 g/m$^2$, coupler M-1 (dispersed in half its weight in tricresylphosphate) at 0.475 mmol/m$^2$ and the masking coupler (dispersed in twice its weight in tricresylphosphate) at 0.135 mmol/m$^2$. The photosensitive layer was overcoated with a layer containing gelatin at 2.69 g/m$^2$ and bis-vinylsulfonyl methyl ether hardener at 1.75 wight percent based on total gel.

Samples of each element were exposed imagewise to green light through a stepped density test object and subjected to the Kodak Flexicolor (C41) process as described in *British Journal of Photography Annual*, 1988, pp. 196–198.

Masking coupler only coatings were generated in a similar manner except that the laydown was 0.405 mmol/m$^2$ and the support was clear estar. These coatings were processed as described and the densities of the magenta dye and the yellow dye at 480 nm were measured as described. In addition, measurements were made to determine the propensity of the combination of the imaging and masking coupler to cause fog upon extended processing (see definition of "Delta Fog Increase"). The results show for the invention an improved masking efficiency as measured by the Delta Density at 480 nm and lessened fogging propensity as measured by Delta Fog Increase. It is clear that satisfactory results are not obtained unless the parent and the azo-group of the mask meet the criteria established by the invention. In each data set for Examples 1 to 4, the comparison tests were substantially deficient in either fog control as measured by Delta Fog Increase, or in masking efficiency as measured by Delta Density at 480 nm. In every example, higher values for efficiency were attained without incurring any significant penalty in fog, and in most cases there is a reduction in fog and improved masking efficiency. Similar results were obtained using other azo- groups.

TABLE IV

| Test | Parent | Azo- | Delta Fog Increase* | Sigma-para | Delta** (Yellow-Magenta) Density at 480 nm |
|---|---|---|---|---|---|
| C-1 | CP-1 | CAZ-1 | .07 | 0.92 | 0.134 |
| C-2 | CP-1 | AZ-1 | −.054 | 0.92 | 0.161 |
| C-3 | BP-1 | CAZ-1 | .098 | 1.64 | 0.156 |
| Inv-Ex. 1 | BP-1 | AZ-1 | −.01 | 1.64 | 0.173 |
| C-4 | CP-1 | CAZ-2 | .121 | 0.92 | 0.125 |
| C-5 | CP-1 | AZ-2 | .039 | 0.92 | 0.179 |
| C-6 | BP-4 | CAZ-2 | .216 | 1.49 | 0.174 |
| Inv-Ex. 2 | BP-4 | AZ-2 | .039 | 1.49 | 0.205 |
| C-7 | CP-1 | CAZ-1 | .07 | 0.92 | 0.134 |
| C-8 | CP-1 | AZ-1 | −.054 | 0.92 | 0.161 |
| C-9 | BP-3 | CAZ-1 | .128 | 2.10 | 0.210 |
| Inv-Ex. 3 | BP-3 | AZ-1 | .046 | 2.10 | 0.201 |
| C-10 | CP-1 | CAZ-2 | .121 | 0.92 | 0.125 |
| C-11 | CP-1 | AZ-1 | −.054 | 0.92 | 0.161 |
| C-12 | BP-4 | CAZ-2 | .216 | 1.49 | 0.174 |
| Inv-Ex. 4 | BP-4 | AZ-1 | −.038 | 1.49 | 0.278 |

*Delta Fog Increase = Difference in Delta Green Dmin of image coupler plus masking coupler coating relative to image coupler only coating. Delta Green Dmin is the difference in green Dmin between a 6'15" and a 3'15" developed C41 process.
**Delta Yellow-Magenta Density @ 480 nm = Difference in density at 480 nm between the yellow form of the masking coupler and the corresponding magenta dye formed after reaction with Dox (determined from masking coupler only film coatings). It is a measure of how much color correction (as detected by photographic paper) is available from the masking coupler.

Examples 5–7

Photographic elements were prepared in a manner similar to the above and were subjected to incubation testing to determine the raw stock keeping properties of the combination of image and masking couplers. The Dmax Fresh and after the 4 week humidity test were compared to determine the extent of degradation in image coupler. Table V shows the results of the testing under the indicated incubation conditions. The results show that the image coupler degradation caused by the presence of the masking coupler (as measured by loss in Dmax) is substantially reduced in the case of the invention compared to the photographic elements containing the comparative masking couplers.

TABLE V

| Test | Parent | Azo- | Loss in Dmax Density* |
|---|---|---|---|
| C-13 | CP-1 | CAZ-1 | −.816 |
| C-14 | CP-1 | AZ-1 | −.770 |
| C-15 | BP-1 | CAZ-1 | −.690 |
| Inv-Ex. 5 | BP-1 | AZ-1 | −.680 |
| C-16 | CP-1 | CAZ-1 | −.816 |
| C-17 | CP-1 | AZ-1 | −.770 |
| C-18 | BP-3 | CAZ-1 | −.786 |
| Inv-Ex. 6 | BP-3 | AZ-1 | −.625 |
| C-19 | CP-1 | CAZ-1 | −.816 |
| C-20 | CP-1 | AZ-1 | −.770 |
| C-21 | BP-2 | CAZ-1 | −.826 |
| Inv-Ex. 7 | BP-2 | AZ-1 | −.617 |

*Loss in Dmax = Measure of Raw stock Keeping comparing the difference in Dmax (C41 process) between Fresh and 4 weeks at 100° F./50% Relative Humidity.

TABLE VI

| Test | Parent | Azo- | Delta Density at 480 nm | Loss in Dmax Density |
|---|---|---|---|---|
| C-22 | CP-1 | CAZ-1 | .242 | −.57 |
| C-23 | BP-1 | CAZ-3 | .194 | −.11 |
| C-24 | BP-4 | CAZ-5 | .215 | −.85 |
| C-25 | BP-1 | CAZ-6 | .099 | −.17 |
| C-26 | BP-1 | CAZ-7 | .143 | −.80 |
| C-27 | BP-4 | CAZ-7 | .199 | −.93 |
| C-28 | BP-4 | CAZ-8 | .015 | −.97 |
| C-29 | NONE | NONE | N.A. | −.10 |
| Inv-Ex 8 | BP-1 | AZ-16 | .241 | −.18 |
| Inv-Ex 9 | BP-1 | AZ-30 | .251 | −.06 |

The results of Table VI again show that the combined benefit of efficient masking and low image coupler degradation are obtained only with the masking coupler of the invention.

The invention has been described in detail with particular reference to the preferred embodiments thereof, but, it will be understood that variations and modifications can be effected within the spirit and scope of the invention.

What is claimed is:

1. A photographic element comprising a support bearing a light-sensitive photographic silver halide layer having associated therewith a masking coupler comprising:

(1) a parent group containing a -1-phenyl-3-anilinopyrazolin-5-one having electron-withdrawing substituents on the phenyl and anilino rings of a type and number sufficient to provide a combined Hammett sigma(para) value for such substituents of at least 1.4;

(2) a coupling-off group at the 4 position of the pyrazolone of the parent group comprising an arylazo dye containing on the aryl ring the following:

(A) a substituent para to the azo functionality which is a carbonamido group, unsubstituted or substituted with nonaromatic groups, and (B) "n" additional substituents selected from the group consisting of alkyl, alkoxy, carbonamido, and sulfonamido, unsubstituted or substituted with nonaromatic groups, where "n" is 0 to 4;

provided that substituent (A) and a substituent (B) may form a ring wherein one of the substituents (A) or (B) contains an alkyl group of at least 8 carbon atoms, unsubstituted or substituted with nonaromatic substituents, and said substituent contains at least of the saturated carbon atoms in all of the substituents (A) and (B) provided that where the substituent (A) forms a ring with a substituent (B), the entire ring will be counted as said one of the substituents which contains an alkyl group of at least carbon atoms for purposes of satisfying the 70% requirement.

2. A photographic element comprising a support bearing a light-sensitive photographic silver halide layer having associated therewith a 1-phenyl-3-anilino-4-arylazopyrazolin-5-one masking coupler having formula I:

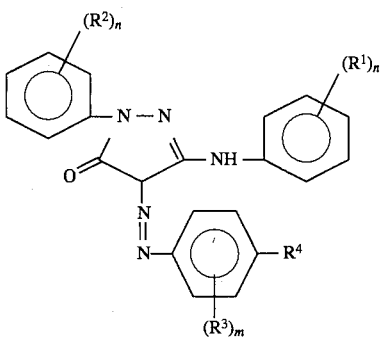

wherein
- each $R^1$ and each $R^2$ is a substituent independently selected so that the combined electron withdrawing strength is sufficient to obtain a Hammett sigma(para) sum for all the $R^1$ and $R^2$ substituents of at least 1.4;
- each $R^3$ is selected from the group consisting of alkyl, alkoxy, carbonamido, and sulfonamido, or constitutes one or more fused rings, each unsubstituted or substituted with nonaromatic groups;
- each n is 0 to 5 and m is 0 to 4;
- $R^4$ is a carbonamido group, unsubstituted or substituted with nonaromatic groups, where $R^4$ may be connected with $R^3$ to form a ring; and
- one $R^3$ or the $R^4$ group contains an alkyl group of at least 8 carbon atoms and which contains at least 70% of the saturated carbon atoms contained in all of the $R^3$ and $R^4$ groups combined provided that when $R^3$ and $R^4$ form a ring, the entire ring will be counted as $R^4$ for purposes of satisfying the 70% requirement.

3. The element of claim 2 wherein at least one of the $R^1$ substituents is chloride.

4. The element of claim 2 wherein at least one $R^1$ substituent has a Hammett sigma(para) value of at least 0.4.

5. The element of claim 2 wherein the arylazo group is a phenylazo group.

6. The element of claim 2 wherein $R^3$ is selected from the group consisting of alkyl and alkoxy.

7. The element of claim 2 wherein the $R^3$ substituent contains from one to 16 carbon atoms.

8. The element of claim 7 wherein m is at least 1 and each $R^3$ contains up to three saturated carbon atoms.

9. The element of claim 7 wherein at least one of the $R^3$ and $R^4$ groups contains at least 10 saturated carbon atoms.

10. The element of claim 2 wherein at least one $R^3$ is selected from the group consisting of alkyl and alkoxy.

11. The element of claim 10 wherein said at least one $R^3$ contains at least 8 carbon atoms.

12. The element of claim 10 wherein $R^4$ contains at least 8 carbon atoms.

13. The element of claim 2 wherein there are present at least two $R^1$ substituents and at least one $R^2$ substituent.

14. The element of claim 13 wherein said at least two $R^1$ substituents are chlorine.

15. The element of claim 13 wherein at least one $R^1$ is chlorine or alkoxy located in the position ortho to the amine function.

16. The element of claim 13 wherein at least one $R^1$ is a sulfonyl or sulfonamide group located in the position para to the amine function.

17. The element of claim 2 wherein the element additionally comprises a substrate bearing a magnetic layer.

18. A process of forming an image in an exposed element as described in claim 2, comprising developing said element in the presence of a color developing agent.

19. A photographic element comprising a support bearing a light-sensitive photographic silver halide layer having associated therewith a masking coupler having formula I:

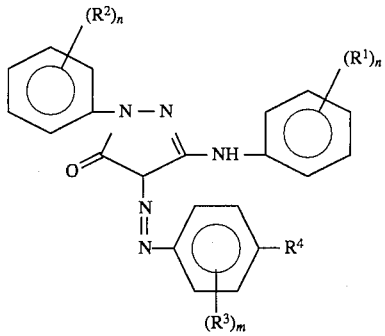

wherein
- each $R^1$ and each $R^2$ is a substituent independently selected so that the combined electron withdrawing strength is sufficient to obtain a Hammett sigma(para) sum for all the $R^1$ and $R^2$ substituents of at least 1.4;
- each $R^3$ is selected from the group consisting of alkyl, alkoxy, carbonamido, and sulfonamido, or constitutes one or more annulated rings, each unsubstituted or substituted with nonaromatic groups;
- each n is 0 to 5 and m is 0 to 4;
- $R^4$ is independently selected from the group consisting of hydroxyl, and alkoxy, carbonamido, and sulfonamido, each unsubstituted or substituted with nonaromatic groups, where $R^4$ may be connected with $R^3$ to form a ring; and
- one $R^3$ or $R^4$ group contains an alkyl group of at least 8 carbon atoms and which contains at least 70% of the saturated carbon atoms contained in all of the $R^3$ and $R^4$ groups combined provided that when $R^3$ and $R^4$ form a ring, the entire ring will be counted as $R^4$ for purposes of satisfying the 70% requirement; and
- wherein at least one of the $R^1$ substituents is chloride.

20. The element of claim 19 wherein the arylazo group is a phenylazo group.

21. The element of claim 19 wherein $R^4$ is selected from hydroxy and alkoxy.

22. The element of claim 19 wherein $R^3$ is selected from the group consisting of alkyl and alkoxy.

23. The element of claim 19 wherein the $R^3$ substituent contains from one to 16 carbon atoms.

24. The element of claim 23 wherein at least one of the $R^3$ and $R^4$ groups contains at least 10 saturated carbon atoms.

25. The element of claim 19 wherein the element additionally comprises a substrate bearing a magnetic layer.

26. A process of forming an image in an exposed element as described in claim 19, comprising developing said element in the presence of a color developing agent.

27. A photographic element comprising a support bearing a light-sensitive photographic silver halide layer having associated therewith a masking coupler having formula I:

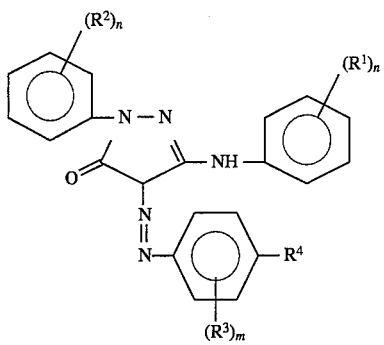

wherein
- each $R^1$ and each $R^2$ is a substituent independently selected so that the combined electron withdrawing strength is sufficient to obtain a Hammett sigma(para) sum for all the $R^1$ and $R^2$ substituents of at least 1.4;
- each $R^3$ is selected from the group consisting of alkyl, alkoxy, carbonamido, and sulfonamido, or constitutes one or more annulated rings, each unsubstituted or substituted with nonaromatic groups;
- each n is 0 to 5 and m is 0 to 4;
- $R^4$ is independently selected from the group consisting of hydroxyl, and alkoxy, carbonamido, and sulfonamido, each unsubstituted or substituted with nonaromatic groups, where $R^4$ may be connected with $R^3$ to form a ring; and
- one $R^3$ or $R^4$ group contains an alkyl group of at least 8 carbon atoms and which contains at least 70% of the saturated carbon atoms contained in all of the $R^3$ and $R^4$ groups combined provided that when $R^3$ and $R^4$ form a ring, the entire ring will be counted as $R^4$ for purposes of satisfying the 70% requirement; and
- wherein m is at least 1 and each $R^3$ contains up to three saturated carbon atoms.

28. A photographic element comprising a support bearing a light-sensitive photographic silver halide layer having associated therewith a masking coupler having formula I:

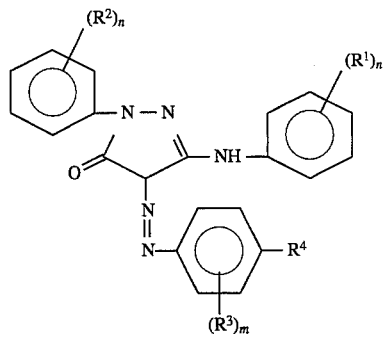

wherein
- each $R^1$ and each $R^2$ is a substituent independently selected so that the combined electron withdrawing strength is sufficient to obtain a Hammett sigma(para) sum for all the $R^1$ and $R^2$ substituents of at least 1.4;
- each $R^3$ is selected from the group consisting of alkyl, alkoxy, carbonamido, and sulfonamido, or constitutes one or more annulated rings, each unsubstituted or substituted with nonaromatic groups;
- each n is 0 to 5 and m is 0 to 4;
- $R^4$ is independently selected from the group consisting of hydroxyl, and alkoxy, carbonamido, and sulfonamido, each unsubstituted or substituted with nonaromatic groups, where $R^4$ may be connected with $R^3$ to form a ring; and
- one $R^3$ or $R^4$ group contains an alkyl group of at least 8 carbon atoms and which contains at least 70% of the saturated carbon atoms contained in all of the $R^3$ and $R^4$ groups combined provided that when $R^3$ and $R^4$ form a ring, the entire ring will be counted as $R^4$ for purposes of satisfying the 70% requirement; and
- wherein at least one $R^3$ is present selected from the group consisting of alkyl and alkoxy, and $R^4$ contains at least 8 carbon atoms.

29. The element of claim 28 wherein $R^4$ contains at least 8 carbon atoms.

30. The element of claim 28 wherein there are present at least two $R^1$ substituents and at least one $R^2$ substituent.

31. A photographic element comprising a support bearing a light-sensitive photographic silver halide layer having associated therewith a masking coupler having formula I:

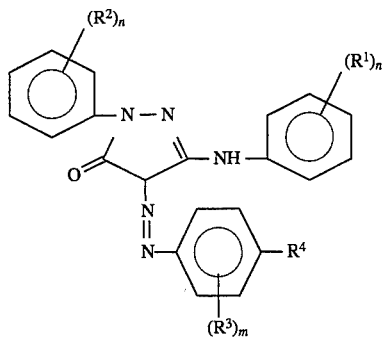

wherein
- each $R^1$ and each $R^2$ is a substituent independently selected so that the combined electron withdrawing strength is sufficient to obtain a Hammett sigma(para) sum for all the $R^1$ and $R^2$ substituents of at least 1.4;
- each $R^3$ is selected from the group consisting of alkyl, alkoxy, carbonamido, and sulfonamido, or constitutes one or more annulated rings, each unsubstituted or substituted with nonaromatic groups;
- each n is 0 to 5 and m is 0 to 4;
- $R^4$ is independently selected from the group consisting of hydroxyl, and alkoxy, carbonamido, and sulfonamido, each unsubstituted or substituted with nonaromatic groups, where $R^4$ may be connected with $R^3$ to form a ring; and
- one $R^3$ or $R^4$ group contains an alkyl group of at least 8 carbon atoms and which contains at least 70% of the saturated carbon atoms contained in all of the $R^3$ and $R^4$ groups combined provided that when $R^3$ and $R^4$ form a ring, the entire ring will be counted as $R^4$ for purposes of satisfying the 70% requirement; and
- wherein there are present at least two $R^1$ substituents which are chlorine and at least one $R^2$ substituent.

32. A photographic element comprising a support bearing a light-sensitive photographic silver halide layer having associated therewith a masking coupler having formula I:

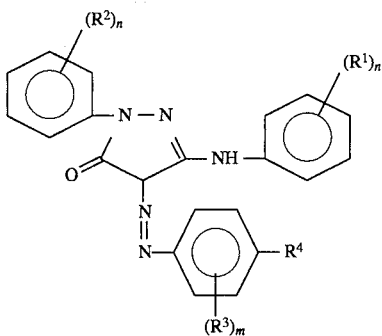

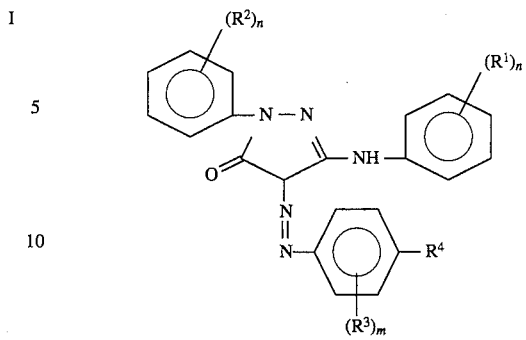

wherein
- each $R^1$ and each $R^2$ is a substituent independently selected so that the combined electron withdrawing strength is sufficient to obtain a Hammett sigma(para) sum for all the $R^1$ and $R^2$ substituents of at least 1.4;
- each $R^3$ is selected from the group consisting of alkyl, alkoxy, carbonamido, and sulfonamido, or constitutes one or more annulated rings, each unsubstituted or substituted with nonaromatic groups;
- each n is 0 to 5 and m is 0 to 4;
- $R^4$ is independently selected from the group consisting of hydroxyl, and alkoxy, carbonamido, and sulfonamido, each unsubstituted or substituted with nonaromatic groups, where $R^4$ may be connected with $R^3$ to form a ring; and
- one $R^3$ or $R^4$ group contains an alkyl group of at least 8 carbon atoms and which contains at least 70% of the saturated carbon atoms contained in all of the $R^3$ and $R^4$ groups combined provided that when $R^3$ and $R^4$ form a ring, the entire ring will be counted as $R^4$ for purposes of satisfying the 70% requirement; and
- wherein at least one $R^1$ is chlorine or alkoxy located in the position ortho to the amine function.

33. A photographic element comprising a support bearing a light-sensitive photographic silver halide layer having associated therewith a masking coupler having formula I:

wherein
- each $R^1$ and each $R^2$ is a substituent independently selected so that the combined electron withdrawing strength is sufficient to obtain a Hammett sigma(para) sum for all the $R^1$ and $R^2$ substituents of at least 1.4;
- each $R^3$ is selected from the group consisting of alkyl, alkoxy, carbonamido, and sulfonamido, or constitutes one or more annulated rings, each unsubstituted or substituted with nonaromatic groups;
- each n is 0 to 5 and m is 0 to 4;
- $R^4$ is independently selected from the group consisting of hydroxyl, and alkoxy, carbonamido, and sulfonamido, each unsubstituted or substituted with nonaromatic groups, where $R^4$ may be connected with $R^3$ to form a ring; and
- one $R^3$ or $R^4$ group contains an alkyl group of at least 8 carbon atoms and which contains at least 70% of the saturated carbon atoms contained in all of the $R^3$ and $R^4$ groups combined provided that when $R^3$ and $R^4$ form a ring, the entire ring will be counted as $R^4$ for purposes of satisfying the 70% requirement; and
- wherein at least one $R^1$ is a sulfonyl or sulfonamide group located in the position para to the amine function.

* * * * *